United States Patent
Murakami et al.

(10) Patent No.: US 11,487,711 B2
(45) Date of Patent: Nov. 1, 2022

(54) FILE MANAGEMENT APPARATUS, FILE MANAGEMENT METHOD, AND FILE MANAGEMENT PROGRAM

(71) Applicant: Marubeni IT Solutions Inc., Tokyo (JP)

(72) Inventors: Akihiko Murakami, Tokyo (JP); Yoshihiko Kuzume, Tokyo (JP); Takaaki Kumagai, Tokyo (JP)

(73) Assignee: MARUBENI IT SOLUTIONS INC., Tokyo (JP)

( * ) Notice: Subject to any disclaimer, the term of this patent is extended or adjusted under 35 U.S.C. 154(b) by 0 days.

(21) Appl. No.: 16/991,940

(22) Filed: Aug. 12, 2020

(65) Prior Publication Data

US 2021/0049132 A1 Feb. 18, 2021

(51) Int. Cl.
*G06F 3/0481* (2022.01)
*G06F 16/182* (2019.01)
*H04L 67/06* (2022.01)
*G06F 16/16* (2019.01)

(52) U.S. Cl.
CPC ........ *G06F 16/1824* (2019.01); *G06F 3/0481* (2013.01); *G06F 16/168* (2019.01); *H04L 67/06* (2013.01)

(58) Field of Classification Search
CPC .. G06F 16/1824; G06F 3/0481; G06F 16/168; H04L 67/06
See application file for complete search history.

(56) References Cited

U.S. PATENT DOCUMENTS

| | | | | |
|---|---|---|---|---|
| 7,636,898 B2* | 12/2009 | Takahashi | ........... | G06F 3/04817 715/769 |
| 8,397,246 B2* | 3/2013 | Jalon | ..................... | G06F 16/168 719/329 |
| 2005/0005242 A1* | 1/2005 | Hoyle | ...................... | G06F 9/30 715/745 |
| 2008/0275967 A1* | 11/2008 | Borman | .................... | H04L 9/40 709/219 |

(Continued)

FOREIGN PATENT DOCUMENTS

| | | |
|---|---|---|
| JP | 2004013693 | 1/2004 |
| JP | 2013029957 | 2/2013 |
| JP | 2019133213 | 8/2019 |

OTHER PUBLICATIONS

Japan Patent Office Examiner Shintaro Kimura, Japanese Office Action dated Oct. 21, 2020 in Application No. 2019-149087.

*Primary Examiner* — Anil K Bhargava
(74) *Attorney, Agent, or Firm* — Snell & Wilmer L.L.P.

(57) ABSTRACT

A file management apparatus displays an icon of a file where a shortcut on a cloud storage refers to the file within the cloud storage. A file management apparatus which is connected to a cloud storage on a cloud network via a network and which displays content of a folder within the cloud storage, displays an icon for directly opening a second file or a second folder in a first display region of the file management apparatus for showing content of a first folder in a case where a shortcut file stored in the first folder within the cloud storage is a shortcut file which refers to the second file or the second folder existing outside the first folder, and in which a link to the second file or the second folder is set as a link to a website.

7 Claims, 6 Drawing Sheets

(56) References Cited

U.S. PATENT DOCUMENTS

| | | | |
|---|---|---|---|
| 2008/0276171 A1* | 11/2008 | Sabo | G06F 16/168 |
| | | | 715/711 |
| 2010/0115430 A1* | 5/2010 | Skirpa | G06F 3/0481 |
| | | | 715/760 |
| 2013/0031146 A1* | 1/2013 | Nakashima | H04L 12/6418 |
| | | | 707/822 |
| 2014/0173272 A1 | 6/2014 | Kim | |
| 2014/0359505 A1* | 12/2014 | Cisler | G06F 16/168 |
| | | | 715/810 |
| 2017/0177194 A1* | 6/2017 | Lyons | H04L 67/06 |

* cited by examiner

FILE MANAGEMENT APPARATUS, FILE MANAGEMENT METHOD, AND FILE MANAGEMENT PROGRAM

CROSS-REFERENCE TO RELATED APPLICATIONS

This application claims priority to Japanese Patent Application No. 149087/2019, which was filed on Aug. 15, 2019. This application is incorporated by reference in its entirety for all purposes.

TECHNICAL FIELD

The present invention relates to a display method of link information on a shortcut file within a remote resource.

BACKGROUND ART

Conventionally, there has existed a cloud computing system in which a user can store data and read out and utilize data by accessing a cloud storage on a cloud network from a terminal such as a smartphone and a personal computer apparatus (for example, Japanese Publication No. 2014-508970).

By the way, in a case where a shortcut file is created on a cloud storage, even in a case where the shortcut file refers to a file or a folder within the cloud storage, a link of the shortcut file is expressed as URL. That is, regardless of whether a shortcut file on a cloud storage refers to a file, or the like, outside the cloud storage, or refers to a file, or the like, inside the cloud storage, the shortcut file is created as a shortcut file in which a link to another website is set (hereinafter, referred to as a "WEB shortcut (file)").

Further, in a case where content of the cloud storage as described above is displayed at a file manager (such as, for example, file explorer in Windows (registered trademark) of Microsoft (registered trademark) Corporation) on a local user terminal, a WEB shortcut file existing on the cloud storage is expressed as a file in which a link to a website is set (hereinafter, referred to as a "URL shortcut (file)"),

SUMMARY OF INVENTION

Technical Problem

In a case where a URL shortcut file displayed at a file manager of a local user terminal is executed through click operation, or the like, by a user, a web browser for the Internet is started, and content of a link destination is displayed on the web browser (for example, preview of a file or a website of a folder referred to by the URL shortcut file is displayed on the web browser). That is, even if the WEB shortcut file on the cloud storage refers to a file or a folder within the cloud storage, the web browser for the Internet is started when a URL shortcut file corresponding to the WEB shortcut file is selected, and the user requires to execute subsequent processing on the web browser. Such conventional specifications impair user-friendliness of user operation.

The present invention has been made in view of such a problem.

Solution to Problem

To solve the above-described problem, a first aspect of the present invention is a file management apparatus which is connected via a network to a cloud storage which is a storage region on a cloud network and which displays content of a folder within the cloud storage, the file management apparatus including a display unit configured to display an icon for directly opening a second file or a second folder in a first display region of the file management apparatus for showing content of a first folder in a case where a shortcut file stored in the first folder within the cloud storage is a shortcut file which refers to the second file or the second folder existing outside the first folder within the cloud storage, and in which a link to the second file or the second folder is set as a link to a website.

Further, another aspect of the present invention is a method for displaying content of a folder within a cloud storage, which is to be executed by a computer apparatus connected via a network to the cloud storage which is a storage region on a cloud network, the method including displaying an icon for directly opening a second file or a second folder in a first display region of the computer apparatus for showing content of a first folder in a case where a shortcut file stored in the first folder within the cloud storage is a shortcut file which refers to the second file or the second folder existing outside the first folder within the cloud storage, and in which a link to the second file or the second folder is set as a link to a website.

Further, still another aspect of the present invention is a computer program product for causing a computer apparatus to execute the above-described method.

Further, still another aspect of the present invention is a non-transitory computer readable storage medium, on which a computer program is stored for causing a computer apparatus to execute the above-described method.

DESCRIPTION OF EMBODIMENT

An embodiment of the present invention will be described in detail below with reference to the drawings.
(Configuration of File Management System)

Figure 1:
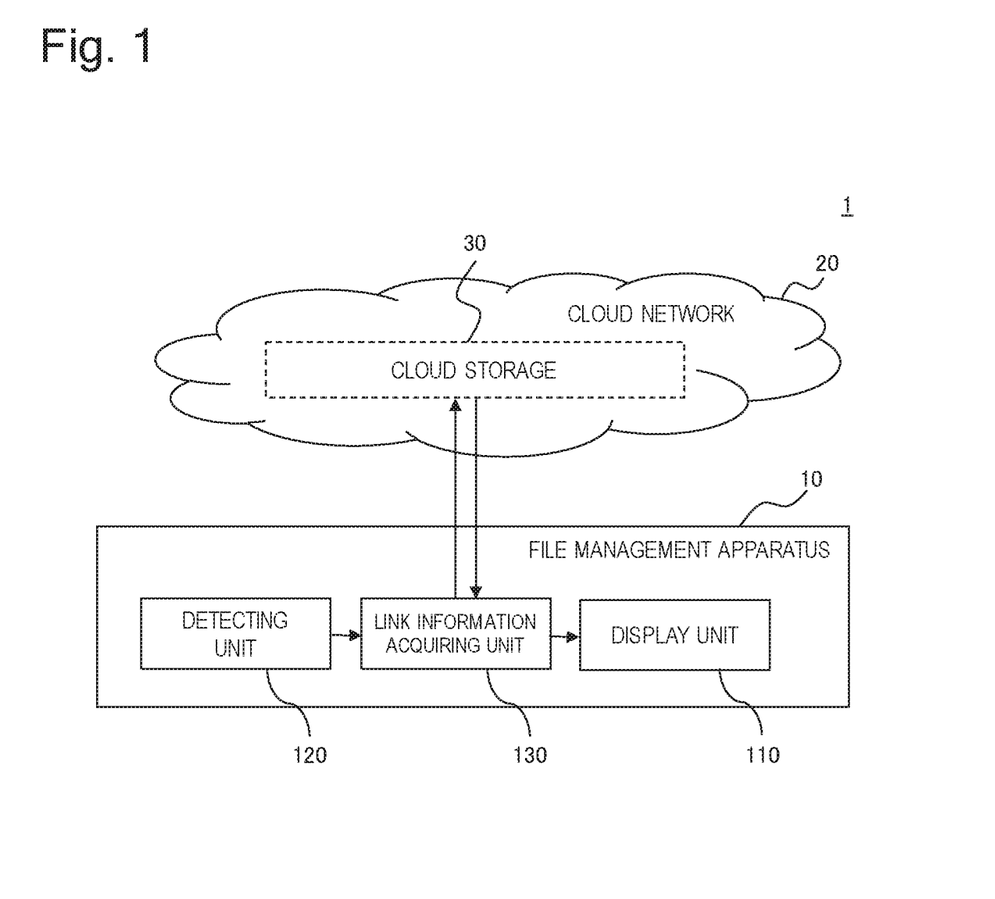
FIG. 1 is a view illustrating an example of a configuration of a file management system including a file management apparatus according to an embodiment of the present invention.

FIG. 1 is a view illustrating an example of a configuration of a file management system including a file management apparatus according to the present embodiment. A file management system 1 illustrated in FIG. 1 includes a file management apparatus 10, and a cloud storage 30 which is a storage region on a cloud network 20. The file management apparatus 10 can be connected to the cloud storage 30 via a network such as the Internet which is not illustrated.

The file management apparatus 10 is a computer apparatus which displays content of a file folder (hereinafter, simply referred to as a "folder") stored within the cloud storage 30 which is a storage region on the cloud network 20. The file management apparatus 10 is assumed to be a terminal apparatus which is operated by a user, or the like, who, for example, receives service from the cloud storage 30, and who creates a folder for the user in the cloud storage 30 and stores data. The file management apparatus 10 can be configured with a computer apparatus such as, for example, a personal computer apparatus, a smartphone and a PDA (Personal Digital Assistant).

A configuration of the file management apparatus 10 will be described in detail below. As illustrated in FIG. 1, the file management apparatus 10 includes a display unit 110, a detecting unit 120 and a link information acquiring unit 130.

The display unit 110 displays an icon for directly opening a second file or a second folder in a first display region of the file management apparatus 10 for showing content of a first folder in a case where a shortcut file stored in the first folder within the cloud storage 30 is a shortcut file which refers to the second file or the second folder existing outside the first folder within the cloud storage 30, and in which a link to the second file or the second folder is set as a link to a website. The "(first display region of the file management apparatus 10) for showing content of a first folder" may include a case where data does not exist in the first folder as well as a case where data such as a file and a lower folder is included in the first folder. Further, the "icon for directly opening a second file or a second folder" may mean an icon for displaying content of the second file or the second folder (including a case where the content is empty) in a case where the user selects the icon through click operation, or the like. In a case where the second file is a file in a file format of Microsoft Word which is application of Microsoft Corporation, the icon, for example, corresponds to an icon for displaying content of a Word file by Microsoft Word being automatically started as a result of being clicked or by the user selecting application to be used to open the file.

Further, the display unit 110 displays an icon of the first folder in a second display region of the file management apparatus 10. Further, the detecting unit 120 detects that the first folder displayed in the second display region is selected. The detecting unit 120 can detect that the user selects the folder through operation for selecting the folder, such as single click and double click using an input device such as a mouse, a keyboard and a touch panel, cursor movement using a keyboard, touch operation using a touch panel, and selection instruction through speech input. At this time, the display unit 110 displays data stored in the selected first folder by being triggered by detection by the detecting unit 120 and (or, in a case where the data stored in the selected first folder does not exist, solely) displays an icon for directly opening the second file or the second folder in the first display region. The "data stored in the selected first folder" can specifically correspond to, for example, a file, a folder and other various kinds of data immediately below the selected first folder.

Here, the "first display region" and the "second display region" can correspond to, for example, a window region, a panel screen, an application screen, a pop-up screen, or the like, in Windows, which is an operating system of Microsoft Corporation, Mac OS (registered trademark), which is an operating system of Apple (registered trademark) Inc., UNIX (registered trademark), which is an operating system of an open group, or the like. Further, the "first display region" and the "second display region" may be a window region of a file manager such as, for example, file explorer in Windows of Microsoft Corporation on the file management apparatus 10.

Further, the first display region and the second display region may be the same region or different regions. The first display region may be a preview screen of the second display region. Further, the first display region may be another window region near the second display region. Further, in a case where there are a plurality of displays of the file management apparatus 10 (for example, in a case of multi-display), or in a case where the file management apparatus 10 is configured with a plurality of computer apparatuses, the first display region and the second display region may be displayed at different displays or may be displayed at the same display.

Further, in a case where a shortcut file stored in the first folder of the cloud storage 30 is a shortcut file which refers to a file or a folder outside the cloud storage 30, the display unit 110 may display a link corresponding to the shortcut file in the first display region of the file management apparatus 10. The "link corresponding to the shortcut file" is, for example, a URL shortcut file (file in which a link to a website is set). The URL shortcut is an Internet shortcut to which an extension of ".url" is added on file explorer in Windows of Microsoft Corporation as an example. That is, the "link corresponding to the shortcut file" is not a link which directly opens a file or a folder when the link is clicked.

The link information acquiring unit 130 acquires link information on the shortcut file stored in the first folder from the cloud storage 30. The link information is a character string (for example, a path) which refers to a location of a file or a folder, for example, set in the shortcut file. Further, at this time, the display unit 110 displays an icon for directly opening a second file or a second folder in the first display region on the basis of the link information acquired in the link information acquiring unit 130. There are the following possible methods for displaying an icon for directly opening the second file or the second folder in the first display region on the basis of the link information. That is, for example, there is a case where a structure of a path of a file or a folder has regularity depending on specifications of the cloud storage 30. For example, if the cloud storage 30 is an enterprise cloud storage which is referred to by a domain of "XXXXXXX.com", if the path is "http://XXXXXXX.com/file/112233445566", the file or the folder is a file ("file") which is stored within the enterprise cloud storage 30, and which is specified with an identifier of "112233445566". Further, for example, if the path is "http://www.YYYYYYY.com/folder/778899001122", the file or the folder is a file ("folder") which is stored in an external enterprise cloud storage which is referred to by "YYYYYYY.com", and which is specified with an identifier of "778899001122". In such a case, by analyzing the link information, the display unit 110 can determine whether inside or outside of the cloud storage 30 is referred to and which file or folder is referred to (including a storage location of the file or the folder). Note that how to utilize the link information described above is merely an example, and is not limited to this.

Note that configurations of the file management system 1 and the file management apparatus 10 illustrated in FIG. 1 are merely an example, and are not limited to this.

(Hardware Configuration)

Figure 2:
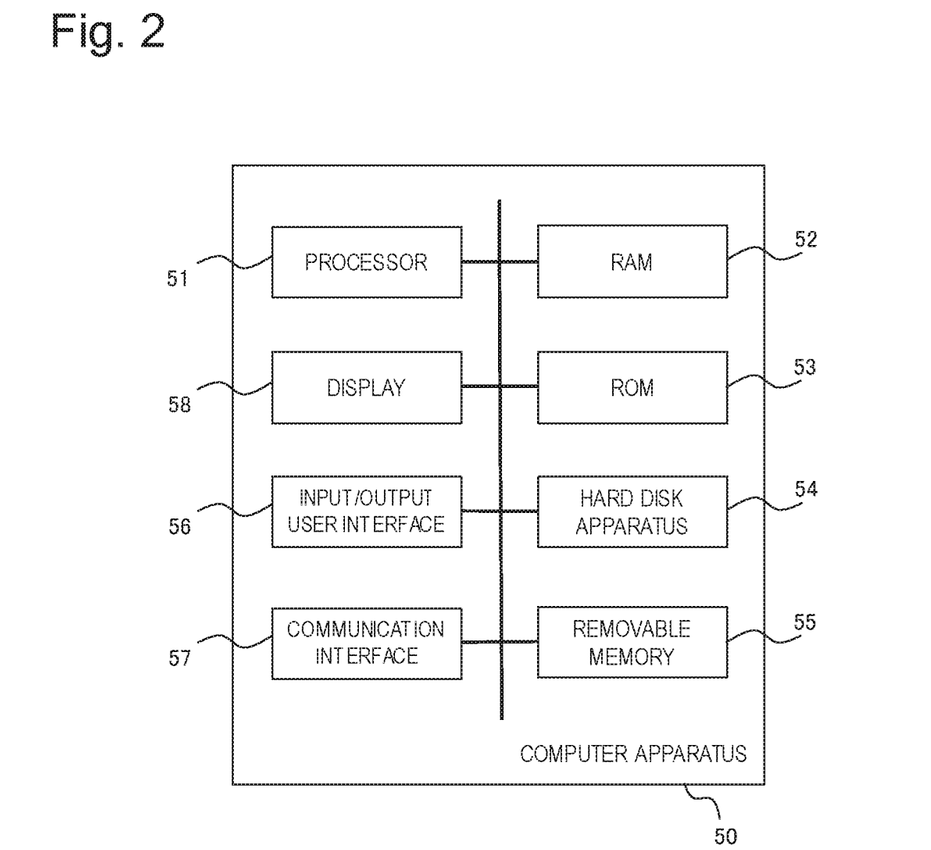
FIG. 2 is a view illustrating an example of a hardware configuration of the file management apparatus according to an embodiment of the present invention.

The configuration of the file management apparatus 10 of the file management system 1 described above can be realized with a hardware configuration which is similar to that of a typical computer apparatus. FIG. 2 is a view illustrating an example of a hardware configuration of the file management apparatus 10. The computer apparatus 50 illustrated in FIG. 2 includes a processor 51, a RAM (Random Access Memory) 52, a ROM (Read Only Memory) 53, a built-in hard disk apparatus 54, a removable memory 55 such as an external hard disk apparatus, a CD, a DVD, a USB memory, a memory stick, and an SD card, an input/output user interface 56 (such as a keyboard, a mouse, a touch panel, a speaker, a microphone and a lamp) to be used by a user to exchange data with the computer apparatus 50, a wired/wireless communication interface 57 which is capable of performing communication with other computer apparatuses, and a display 58, as an example. The function of the file management apparatus 10 according to the present embodiment can be realized by, for example, the processor 51 reading out a program stored in advance in the hard disk apparatus 54, the ROM 53, the removable memory 55, or the like, to a memory such as the RAM 52, and executing the program while reading out the above-described data necessary for processing from the hard disk apparatus 54, the ROM 53, the removable memory 55, or the like, as appropriate.

Further, the display 58 may be a multi-display system. Still further, the file management apparatus 10 may be configured as a single computer apparatus or may be configured with a plurality of computer apparatuses. In the latter case, the respective computer apparatuses may have configurations which are the same as or similar to the configuration of the computer apparatus 50 illustrated in FIG. 2.

Note that the hardware configuration illustrated in FIG. 2 is merely an example, and is not limited to this.

Specific Example

A specific example of the file management system 1 according to the present embodiment will be described below using FIG. 3 to FIG. 5.

Figure 3:
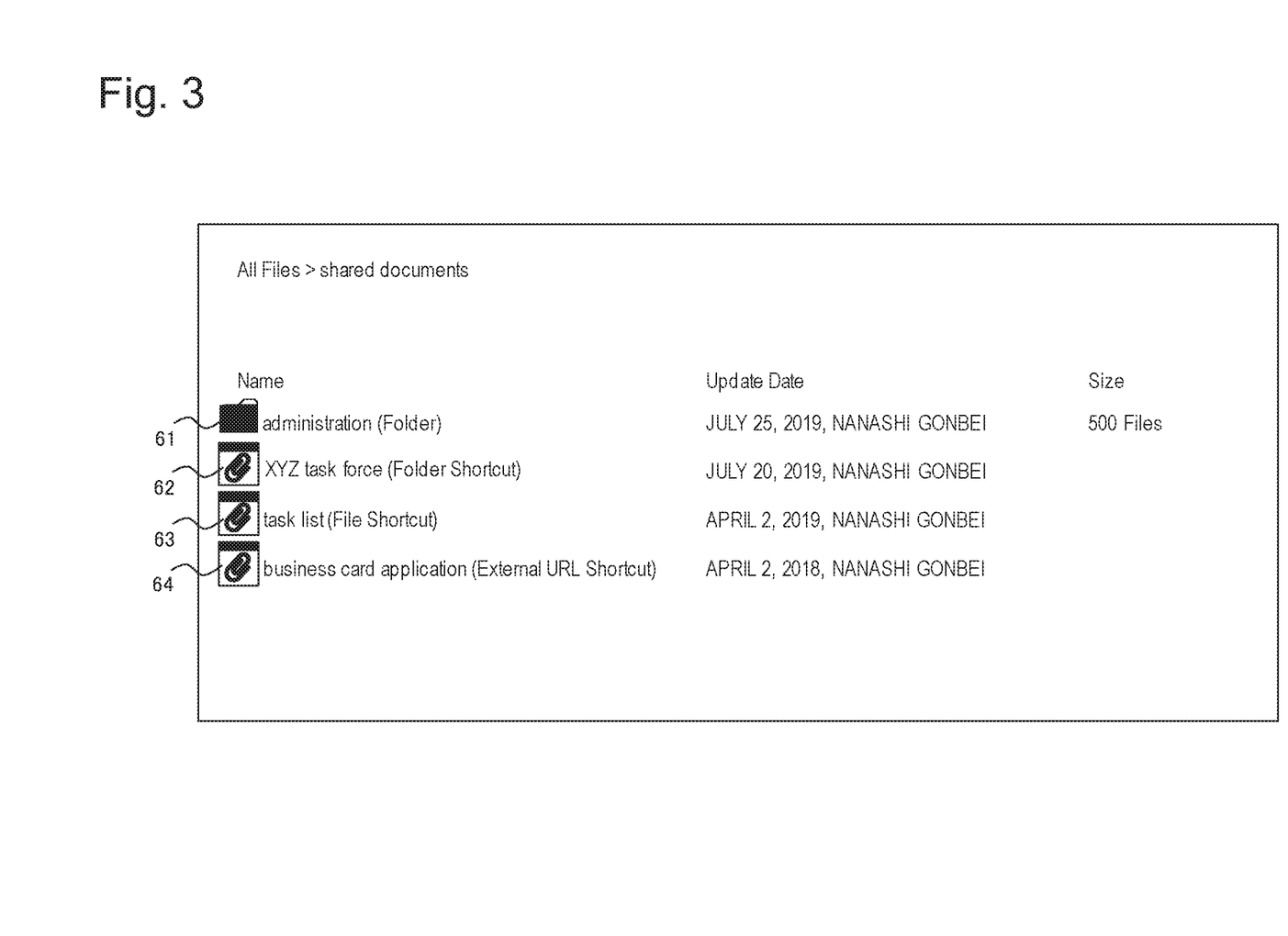
FIG. 3 is a view illustrating a specific example of the file management system according to an embodiment of the present invention.

FIG. 3 is a view illustrating an example where data stored within the cloud storage 30 is displayed on the cloud storage 30. In an example in FIG. 3, aspect is illustrated where, immediately below a "shared document" folder within the cloud storage 30, an "administration" folder 61, a shortcut file 62 of an "XYZ task force", a shortcut file 63 of a "task list" file, and a shortcut file (for example, a WEB shortcut file) 64 of a "business card application" folder existing outside the cloud storage 30 exist. The cloud storage 30 holds information as illustrated in FIG. 3 for each folder stored in the own apparatus.

Figure 4:
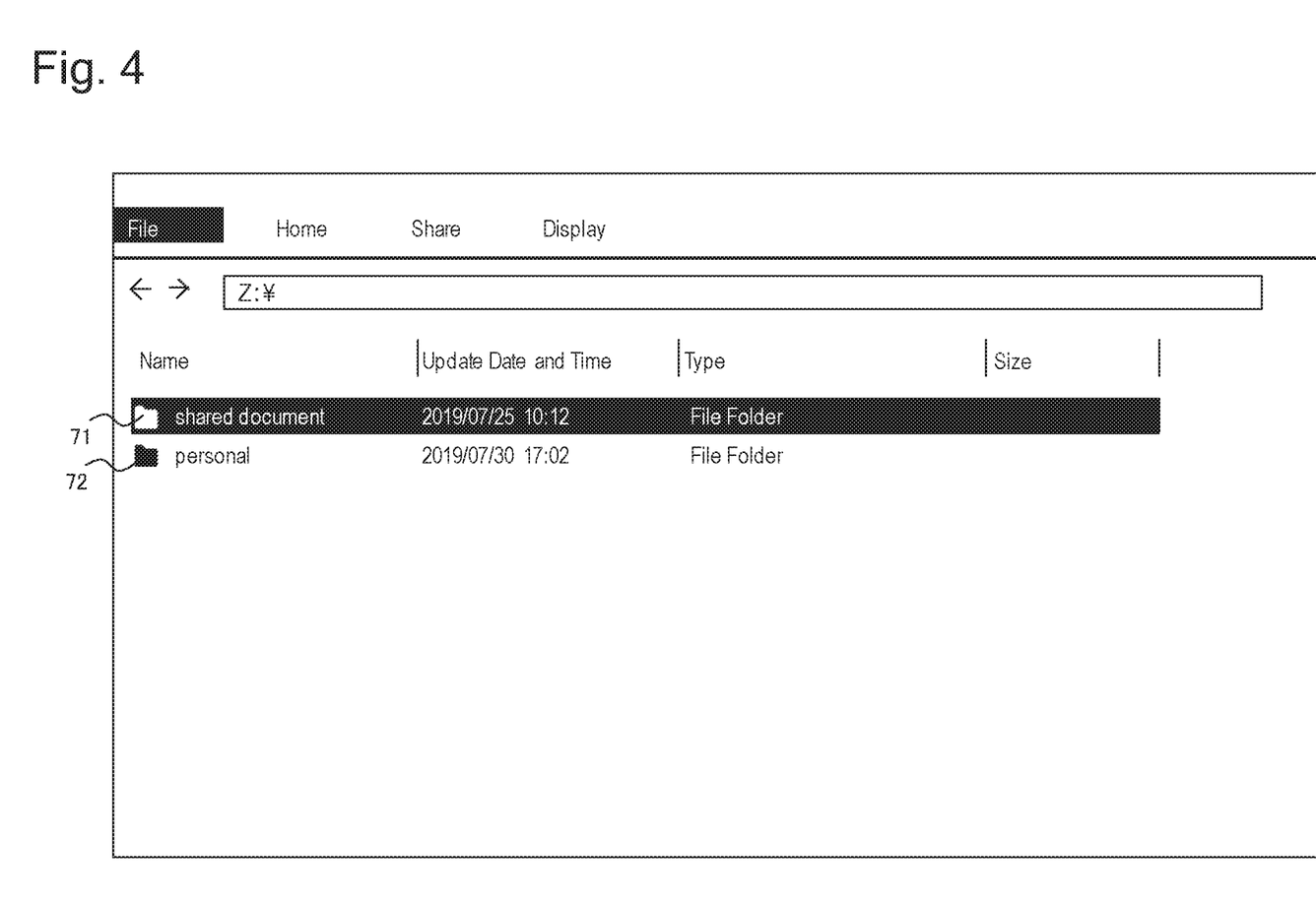
FIG. 4 is a view illustrating a specific example of the file management system according to an embodiment of the present invention.
Figure 5:
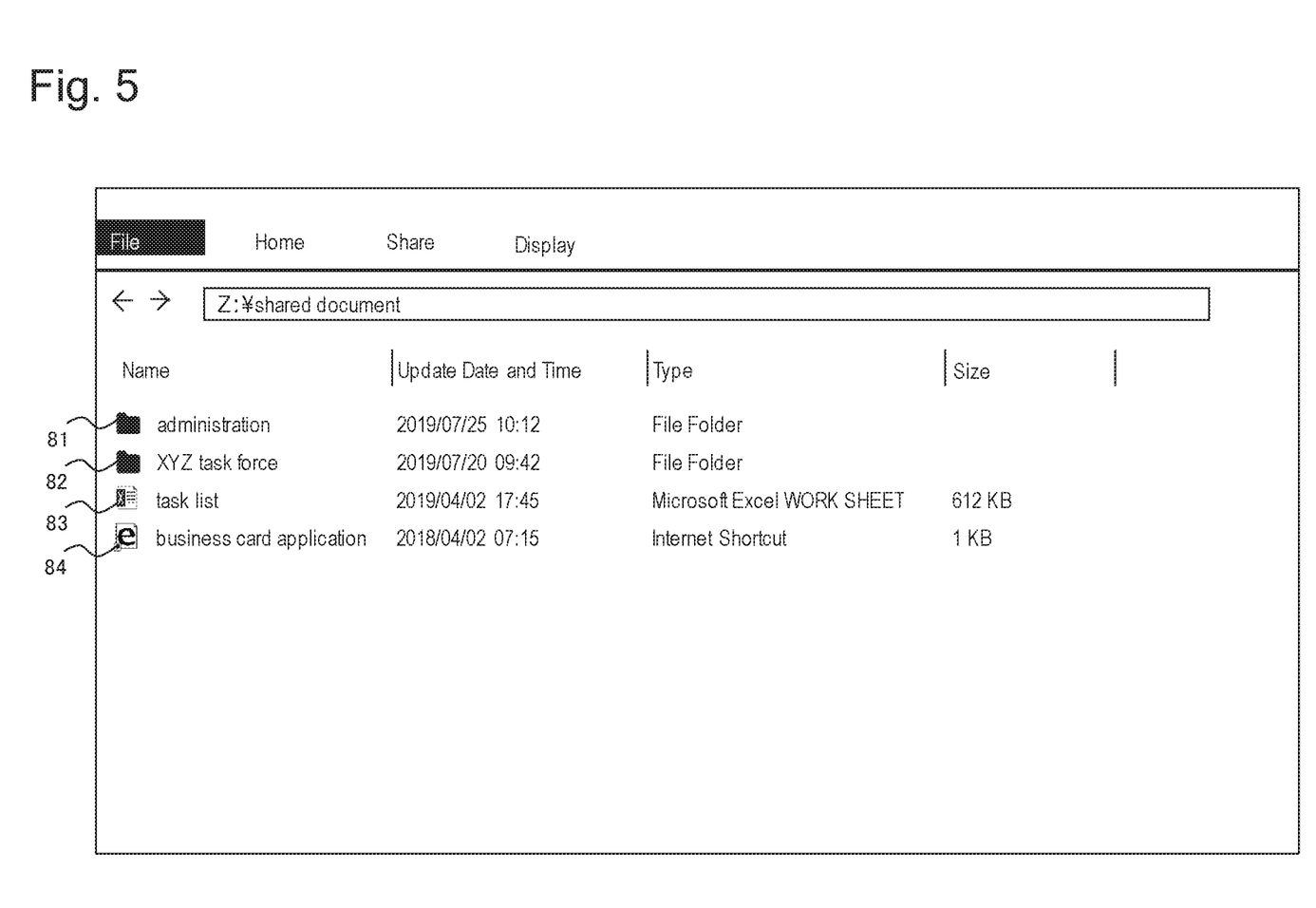
FIG. 5 is a view illustrating a specific example of the file management system according to an embodiment of the present invention.

Further, FIG. 4 and FIG. 5 illustrate an example of a display screen on which data stored within the cloud storage 30 in FIG. 3 is displayed at a display, or the like, of the file management apparatus 10. FIG. 4 illustrates an example of the second display region in a state where a "shared document" folder 71 and a "personal" folder 72 exist immediately below a Z drive (Z:¥) indicating the cloud storage 30. Here, if the user of the file management apparatus 10 selects the "shared document" folder 71 through double click, or the like, by operating an input device such as a mouse, a keyboard and a touch panel, as illustrated in FIG. 5, an icon 81 of an "administration" folder corresponding to the "administration" folder 61 existing within the "shared document" folder within the cloud storage 30, an icon 82 of the "XYZ task force" folder and an icon 83 of the "task list" file respectively corresponding to the shortcut file 62 of the "XYZ task force" folder and the shortcut file 63 of the "task list" file existing within the "shared document" folder of the cloud storage 30, and a shortcut file 84 (URL shortcut) of the "business card application" folder corresponding to the shortcut file of the "business card application" folder existing outside the cloud storage 30 are displayed (first display region). Here, while the "administration" folder (icon 81) is a folder existing immediately below the "shared document" folder, the "XYZ task force" folder (icon 82) is not a folder existing immediately below the "shared document" folder. Therefore, it is also possible to enable the user to distinguish between them by making icons of both folders have different forms.

Further, in a case where the user of the file management apparatus 10 selects the icon 82 of the "XYZ task force" folder and the icon 83 of the "task list" file through click operation, or the like, content of the "XYZ task force" folder and content of the "task list" file are respectively displayed. Further, in a case where the user of the file management apparatus 10 selects the shortcut file 84 (URL shortcut) of the "business card application" folder through click operation, or the like, a web browser for the Internet is started, and content of a link destination is displayed. Specifically, for example, a website of "business card application" is displayed on the web browser.

Processing Sequence

Figure 6:
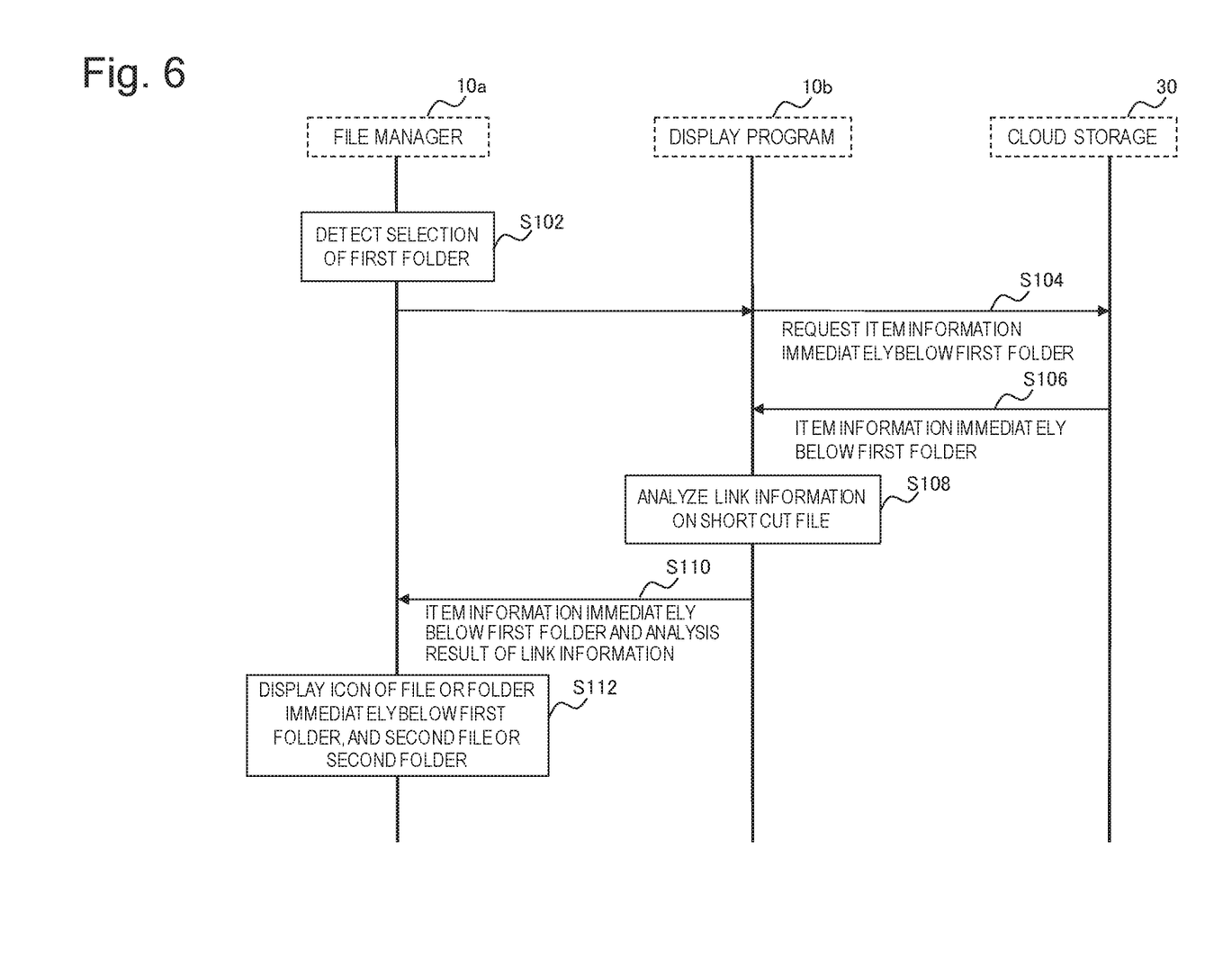
FIG. 6 is a sequence diagram illustrating an example of processing in the file management system according to an embodiment of the present invention.

FIG. 6 is a sequence diagram illustrating an example of processing in the file management system according to the present embodiment. In FIG. 6, a file manager 10a and a display program 10b are computer programs running at the file management apparatus 10 as an example. The file manager 10a may be, for example, a file manager (program) such as file explorer in Windows of Microsoft Corporation.

The detecting unit 120 detects that an icon of the first folder displayed in the second display region by the file manager 10a (display unit 110) is selected through click operation, or the like, by the user (step S102). If it is detected by the detecting unit 120 that the first folder is selected, the display program 10b (link information acquiring unit 130) requests item information existing immediately below the first folder to the cloud storage 30 (step S104). Here, the "item information" can correspond to a file, a folder, a shortcut file, and other various kinds of data existing immediately below the first folder.

The cloud storage 30 acquires item information meaning that there exists a file, a folder, a shortcut file, or the like, which exists immediately below the first folder, with reference to information regarding the first folder among information regarding respective folders held by the cloud storage 30 as illustrated in FIG. 3. Then, the cloud storage 30 transmits the acquired item information to the display program 10b (step S106). Note that the item information can include information on a path set at the shortcut file.

The display program 10b which acquires the item information analyzes the path (link information) of the shortcut file included in the item information. Through analysis of the path, whether the shortcut file refers to a file or a folder within the cloud storage 30 or refers to a file or a folder outside the cloud storage 30, which file or folder is referred to, or the like, is determined (step S108). The display program 10b transmits the item information acquired in step S106 and an analysis result of the path (link information) in step S108 to the file manager 10a (step S110). The file manager 10a (display unit 110) displays an icon of a file or a folder immediately below the first folder, included in the item information, in the first display region. In addition, in a case where the shortcut file existing immediately below the first folder, included in the item information, refers to the second file or the second folder which exists outside the first folder within the cloud storage 30, the file manager 10*a* (display unit 110) displays an icon for directly opening the second file or the second folder in the first display region. Further, in a case where the shortcut file immediately below the first folder, included in the item information refers to a file or a folder outside the cloud storage 30, the file manager 10*a* (display unit 110) displays a link (such as a URL shortcut) corresponding to the shortcut file in the first display region (step S112).

Note that, in the above description, in a case where a plurality of shortcut files exist in the first folder, the processing regarding the shortcut file in step S108, and step S112, or the like, can be executed on the respective shortcut files.

In the above description, the present embodiment has been described as a file management system (or a file management apparatus) and a method to be executed by the file management system (or the file management apparatus). However, it can be understood that the present disclosure can be implemented as a program for causing a processor to execute the method if the program is executed by the processor, or a computer-readable storage medium in which the program is stored.

In the conventional file manager, in a case where a shortcut file exists on the cloud storage 30, even in a case where the shortcut file refers to a file or a folder existing within the cloud storage 30 as well as data outside the cloud storage 30, a link of the shortcut is expressed as URL (WEB shortcut file). Further, in a case where such a WEB shortcut file is displayed in a file manager of a local user terminal, the shortcut file is expressed as a shortcut file in which a link to a website is set (URL shortcut file). By this means, in a case where the URL shortcut file is executed through click operation, or the like, by the user, a web browser for the Internet is started, and content (such as a preview of the file or the folder) of a link destination is displayed on the web browser. Further, the user needs to execute subsequent processing for the file or the folder on the started web browser.

In contrast, according to the file management system (file management apparatus) according to the present embodiment described above, in a case where the user selects a shortcut file existing under the first folder on the cloud storage, in a case where the shortcut file refers to a file or a folder within the cloud storage 30, an icon for directly opening the file or the folder is displayed. It may improve user-friendliness of user operation.

While an embodiment of the present invention has been described above, it goes without saying that the present invention is not limited to the above-described embodiment, and can be implemented in various different forms within the scope of its technical idea.

Further, the scope of the present invention is not limited to the illustrated and described illustrative embodiment, and includes all embodiments which provide effects equivalent to those to be provided from the present invention. Still further, the scope of the present invention is not limited to combination of features of the inventions defined in respective claims, and can be defined by any desired combination of specific features among all the disclosed respective features.

REFERENCE SIGNS LIST

1 file management system
10 file management apparatus
10*a* file manager
10*b* display program
20 cloud network
30 cloud storage
110 display unit
120 detecting unit
130 link information acquiring unit
50 computer apparatus
51 processor
52 RAM
53 ROM
54 hard disk apparatus
55 removable memory
56 input/output user interface
57 communication interface
58 display

What is claimed is:

1. A file management apparatus which is connected via a network to a cloud storage which is a storage region on a cloud network, and which displays content of a folder within the cloud storage, the file management apparatus comprising:
a display unit configured to display an icon of a shortcut file so that a second file or a second folder is directly opened when the icon is selected, in a first display region of the file management apparatus for showing content of a first folder;
in a case where the shortcut file stored in the first folder within the cloud storage is a shortcut file which refers to the second file or the second folder existing outside the first folder within the cloud storage and a link to the second file or the second folder is set in the shortcut file as a link to a website,
wherein the display unit displays an icon of the first folder in a second display region of the file management apparatus;
a detecting unit configured to detect that the first folder displayed in the second display region is selected; and
the display unit
displays data stored in the selected first folder by being triggered by detection by the detecting unit, or
in a case where the data does not exist, solely, displays the icon for directly opening the second file or the second folder in the first display region.

2. The file management apparatus according to claim 1, wherein the first display region and the second display region are a same region.

3. The file management apparatus according to claim 1, wherein, in a case where a shortcut file stored in the first folder is a shortcut file which refers to a file or a folder outside the cloud storage, the display unit displays a link corresponding to the shortcut file in the first display region.

4. The file management apparatus according to claim 1, further comprising:
a link information acquiring unit configured to acquire link information on the shortcut file stored in the first storage from the cloud storage,
wherein the display unit displays the icon for directly opening the second file or the second folder in the first display region on a basis of the link information acquired by the link information acquiring unit.

5. A method for displaying content of a folder within a cloud storage, which is to be executed by a computer apparatus connected via a network to the cloud storage which is a storage region on a cloud network, the method comprising:

displaying an icon of a shortcut file so that a second file or a second folder is directly opened when the icon is selected, in a first display region of the computer apparatus for showing content of a first folder, in a case where the shortcut file stored in the first folder within the cloud storage is a shortcut file which refers to the second file or the second folder existing outside the first folder within the cloud storage and a link to the second file or the second folder is set in the shortcut file as a link to a website;

displaying, by the display unit, an icon of the first folder in a second display region of the file management apparatus;

detecting, by a detecting unit, that the first folder displayed in the second display region is selected; and displaying, by the display unit, at least one of data stored in the selected first folder by being triggered by detection by the detecting unit or, in a case where the data does not exist, solely, the icon for directly opening the second file or the second folder in the first display region.

6. An article of manufacture including a non-transitory, tangible computer readable storage medium having instructions stored thereon that, in response to execution by a computer-based system, cause the computer-based system to perform operations comprising the method according to claim 5.

7. A non-transitory computer readable storage medium, on which a computer program is stored for causing a computer apparatus to execute the method according to claim 5.

* * * * *

UNITED STATES PATENT AND TRADEMARK OFFICE
CERTIFICATE OF CORRECTION

PATENT NO. : 11,487,711 B2
APPLICATION NO. : 16/991940
DATED : November 1, 2022
INVENTOR(S) : Akihiko Murakami, Yoshihiko Kuzume and Takaaki Kumagai It is certified that error appears in the above-identified patent and that said Letters Patent is hereby corrected as shown below:

On the Title Page

Please insert:
--(30) Foreign Application Priority Data
Aug. 15, 2019 (JP) ................149087/2019--.

Signed and Sealed this
Twentieth Day of December, 2022

Katherine Kelly Vidal
*Director of the United States Patent and Trademark Office*